Figure 1:
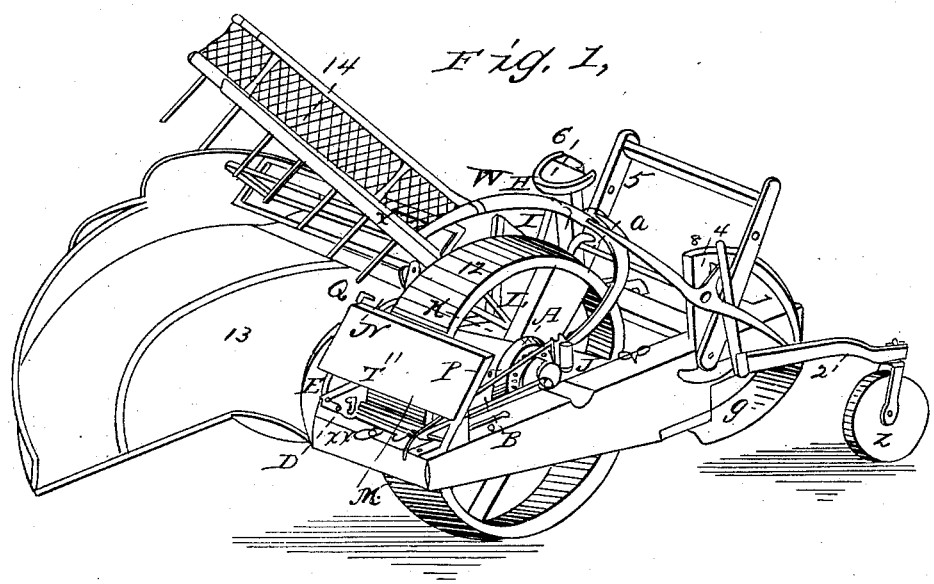

J. H. HARNLY.
Harvester Rake.

No. 37,133.

2 Sheets—Sheet 1.

Patented Dec. 9, 1862.

Witnesses:
Samuel Dayer
Jacob Uhuch

Inventor:
Jacob H. Harnly

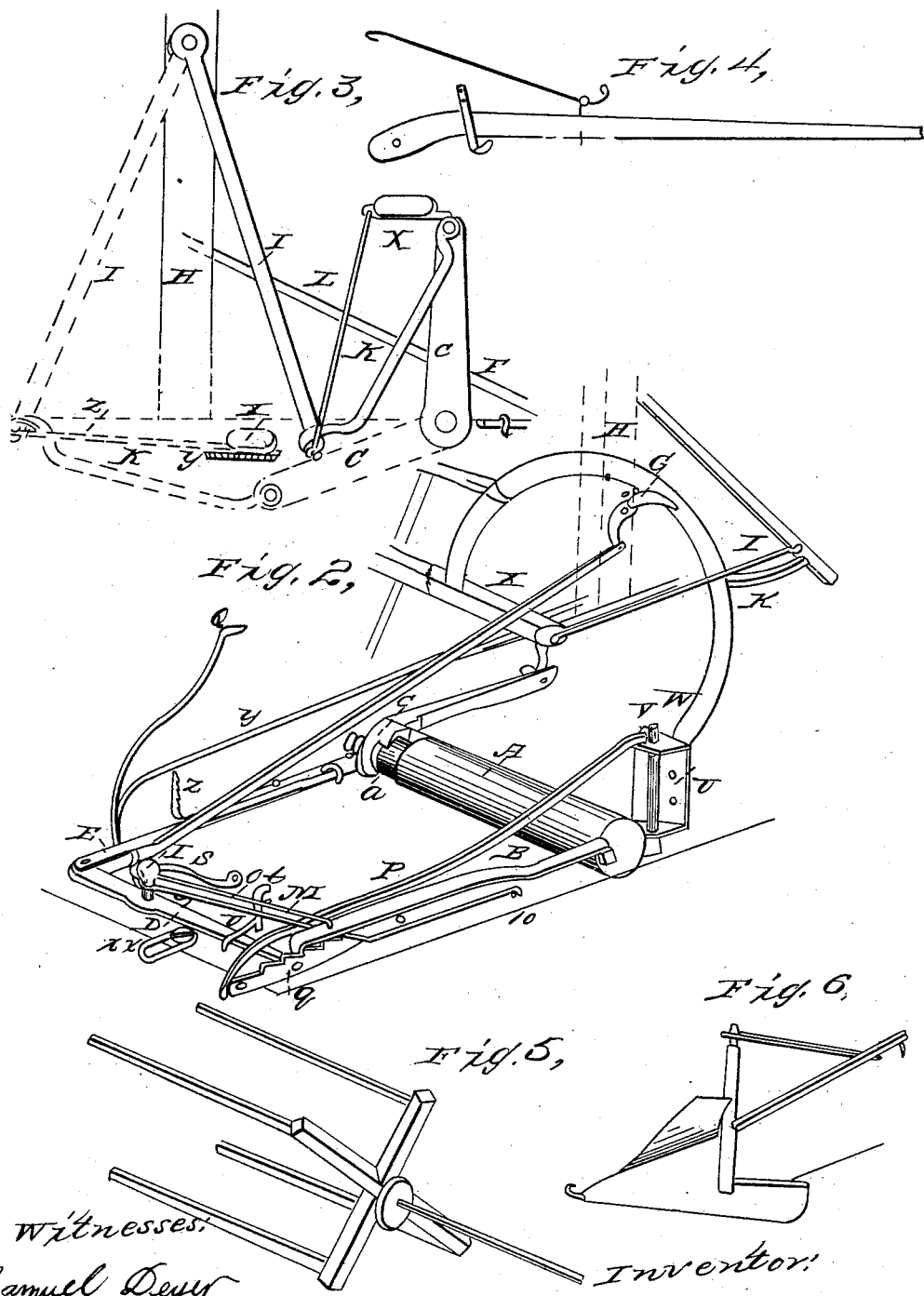

UNITED STATES PATENT OFFICE.

JACOB H. HARNLY, OF PENN TOWNSHIP, LANCASTER COUNTY, PENNSYLVANIA, ASSIGNOR TO HIMSELF, JACOB HARNLY, G. R. HENDRICKSON, AND H. B. DUNLAP, OF SAME PLACE.

IMPROVEMENT IN RAKES FOR HARVESTERS.

Specification forming part of Letters Patent No. 37,133, dated December 9, 1862.

*To all whom it may concern:*

Be it known that I, JACOB H. HARNLY, of Penn township, in the county of Lancaster and State of Pennsylvania, have invented a new and Improved Mode of Operating the Raking Attachment of Harvesters; and I do hereby declare that the following is a full, clear, and exact a description of the construction and operation of the same as can be given, reference being had to the accompanying drawings, making a part of this specification, in which—

Figure 1 is a view of the different parts in place on the harvester, showing the rake elevated on the elbow of the crank-arm and connecting-rod in the act of being carried forward to drop behind the sickles, in order to sweep off the cut grain lodged on the platform, showing the reel on the platform used in cutting clover-seed, the reel for high grain on the inclined arms 5 being left off. Fig. 2 is to illustrate the combination of the several parts with the axle of the driving-wheel disconnected from the wheel and other parts, in order to represent their relative position more clearly on both sides of the wheel.

A represents the axle of the wheel on its outer enlarged side.

*a* is the axle, with its lugs.

*c* is the toothed clutch of the crank-arm on the inner side.

B is the rack-bar, attached eccentrically on the outside at *b*. This bar is provided with a hook for grasping the teeth on the movable ratchet *q*. This ratchet is connected with the lever-arm D, which arm has its fulcrum on the bolt T. At right angles to the lever-arm D is a rod, E, connected by a pivot-joint to and operated by D. The rod E is held by a staple, under which it slides, and comes in contact with the flange on the clutch of the crank-arm C. There is also a spring, *s*, in the rear of and operating against the lever-arm D.

O is a click-rod, bent at right angles, one end fastened to the pivot-bolt T, the other on the top of the outer frame-piece, 10. This rod is carried forward beneath the rack-bar B and behind the hook of the same, and drops into the teeth of the ratchet *q* as the same is drawn back by the hook on the bar B successively as the eccentric motion of the wheel pushes it forward and backward on the ratchet *q*.

M is a rod, also attached to the pivot-bolt T, and connected with the rack-bar B. The tripper P is connected to the top and operated by the rock-shaft U, which receives its motions by that of the curved rake-support W, operated by the crank-arm C and connecting-rods I, L, and K, connected with the rake-head X, said rake-support W also moving on the pivot attachment with or to the rock-shaft U. The long staple V confines the motions of the lever D. The upright *t* has a slot for the reception of the tripper-arm P, which is used to disengage the click-rod *o* and rack-bar B, and thereby arrest the motions of the rake while driving to or from the field.

F is a regulating-rod, sliding under a staple and carried upward and connected with a foot-lever, G, having its fulcrum on the upright H, which also supports the seat of the driver. By depressing it with the foot the rod F presses against the hinged union of the rod E and lever D, shortening the ratchet *q* and increasing the action of the rake at will.

*x x* is a regulating-bolt that by pressing the lever-arm in any desired distance to increase the speed of the raking motion will keep it fixed according to the speed desired, allowing the driving-wheel to make one, two, three, or more revolutions to each action of the rake, as will be further explained in the motions of the crank. The crank, united with the clutch C, has a spring, *c*, which is acted upon in its motions in and out of gear. The inner face has ratchet-notches for the lugs on the axle, and when the lugs are in contact with the teeth of the crank-arm clutch it is carried around with the motions of the axle. When out of gear, the axle revolves within the crank-arm clutch without moving the crank-arms. These ratchet-teeth also prevent the motion of the crank in backing the machine or harvester, as the lugs, moving against the inclined plane of the clutch, press the clutch outward against the spring as it successively clicks over the tooth or terminus of each plane.

Fig. 3 shows the relative position and connections of the rake-head *x*, and connecting-rods L K, and vibrating rod I—the black lines when the rake-head $x$ is centrally poised on the elbow made by the union of the connecting-rod K with the crank-arm C, and the red lines their position after the crank has performed its office in carrying forward the rake and dropping it on the edge $y$ of the inner rim of the platform, on which it rests and slides in its raking motion over the platform until at its terminus it is pressed upward and lodged on the top of the rod Q, where it rests during one, two, or more revolutions of the wheel, according to the regulation or wish of the operator. There is also a toothed rod, $z$, Fig. 2, against which the connecting-rod K is brought and its motions graduated. This rod $z$ is affixed to the side of the rim $y$, between which and the inside frame-work of the harvester the crank and rods have their motion.

I is a vibrating bar fastened on a pivot to the upright H, near the (outside of the) seat 6, Fig. 1.

L is a drag-rod connected with the rake-head $x$, and union of the connecting-rod K with the vibrating rod I, operating conjointly in the motions of the crank-arm, &c.

It may be stated that the office of the toothed spring-rod $z$ is to prevent the dropping of the connecting-rod and crank-arm by their own gravitation, when ungeared from the lugs, at the time the end of the rod E presses out the clutch against the spring forced against the head on the axle.

In describing the several parts much of their operation has also been noticed. I will only add that in each revolution of the wheel the rack-bar B is pushed forward and the hook drops over a tooth in the ratchet-segment $q$ of the lever D, and as it is again drawn back (by means of its eccentric or crank-like attachment at $b$) it carries the ratchet-lever inward, when the click-rod $o$ will drop over the forward tooth of the ratchet and hold the lever D until the rack-bar is pressed forward again and seizes upon the next tooth. Thus according to the number of the teeth operated upon by the hooked rack-bar will be the revolutions of the wheel without dislodging the rake-head $x$ from its support on Q; but when the ratchet and lever are drawn in, the clutch-flange on the arm C of the crank becomes disengaged from the terminus of the rod E, and the clutch is pressed inward by the spring $c$ against the lugs on the axle, carrying the crank with it, which lifts the rake-head from its lodgment and carries it elevated above the platform, to be dropped again behind the sickles to repeat the operation. Complicated and difficult to describe or illustrate, the operation is nevertheless simple and satisfactory, nor is it liable to get out of repair, there being no cogged gearing required, and the ease with which the motions of the rake can be governed and regulated for thin or heavy grain is of the greatest importance. Altogether it is compact, and will perform its work to admiration.

Fig. 4 shows my tongue and rod for equalizing the draft and adapting its vibrations to the motions of the horses; Fig. 5, the reel applied when cutting grain; Fig. 6, the shoe applied to the cutter-bar when the platform is removed to cut clover or grass for making hay. These, however, form no part of the raking. There is also some novelty in my compound lever to regulate the front of the machine, Fig. 1, Nos. 1, 2, 3, and 4. These I simply mention in this place as constituting parts of my harvester I deem novel in some respects apart from the raking appliances, more particularly presented as the main features of my application.

I am aware that there are numerous devices patented for operating rakes on harvesters, in which eccentrics, levers, springs, cranks, &c., are employed, nor do I claim any of those, separately considered, as novel.

What I claim as my invention, and desire to secure by Letters Patent, is—

1. The combined action of the crank-arm and its clutch C by means of the spring $c$, pressing it against the lugs on the axle $a$, and the terminus of the rod E, connected with the ratchet-lever D $q$, pressing the clutch out, thereby jointly controlling the crank-motion.

2. The combined foot-lever G, with its rod F, operating against the jointed ratchet-lever E D $q$, for regulating the speed of the rake at will, applied in the manner specified.

3. The rack-bar B, with its hook at one end and eccentric attachment to the axle at the other, in combination with the ratchet-lever D $q$, click-rod O, and connecting-rod M, arranged in the manner and for the purpose specified.

4. The rock-shaft U, with its curved rake-support W, in combination with the tripper-rod P, rods $o$ M, and notched post $t$, operating in the manner and for the purpose specified.

5. The arrangement and combination of the crank-arm C with the connecting-rods K L, vibrating bar I, and notched spring-rod or holder $z$, all operating in unison with the rack-bar B by the revolution of the driving-wheel on its axle A, in the manner set forth.

JACOB H. HARNLY.

Witnesses:
JACOB UHRICH,
SAMUEL DEYER.